US010965909B2

(12) United States Patent
Tanaka et al.

(10) Patent No.: US 10,965,909 B2
(45) Date of Patent: Mar. 30, 2021

(54) IMAGE PROCESSING APPARATUS, CAMERA APPARATUS, AND IMAGE PROCESSING METHOD

(71) Applicant: YAMAHA CORPORATION, Hamamatsu (JP)

(72) Inventors: Ryo Tanaka, Concord, MA (US); Koichiro Sato, Hamamatsu (JP); Yoshifumi Oizumi, Hamamatsu (JP); Kazuko Nishi, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 16/568,776

(22) Filed: Sep. 12, 2019

(65) Prior Publication Data
US 2020/0099890 A1    Mar. 26, 2020

(30) Foreign Application Priority Data
Sep. 21, 2018 (JP) .............................. JP2018-176898

(51) Int. Cl.
*H04N 7/14* (2006.01)
*H04N 7/15* (2006.01)
(Continued)

(52) U.S. Cl.
CPC ............ *H04N 7/152* (2013.01); *G06F 13/14* (2013.01); *H04M 3/563* (2013.01); *G06T 1/20* (2013.01); *G06T 1/60* (2013.01)

(58) Field of Classification Search
CPC ...................................................... H04N 7/14
See application file for complete search history.

(56) References Cited

U.S. PATENT DOCUMENTS 5,764,277 A * 6/1998 Loui ...................... H04N 7/152
348/14.01
6,297,846 B1   10/2001 Edanami
(Continued)

FOREIGN PATENT DOCUMENTS

| JP | 2011061314 A | 3/2011 |
| JP | 2015019162 A | 1/2015 |
| WO | 2018061173 A1 | 4/2018 |

OTHER PUBLICATIONS

Extended European Search Report issued in European Appln. No. 19198684.3 dated Feb. 6, 2020.
(Continued)

*Primary Examiner* — Olisa Anwah
(74) *Attorney, Agent, or Firm* — Rossi, Kimms & McDowell LLP

(57) ABSTRACT

An image processing apparatus includes an image data obtainer that obtains image data of an image that captures a plurality of conference participants, a face image detector that detects a face image of each of the plurality of conference participants from the image data obtained by the image data obtainer, an image organizer that extracts a detected face image and reorganizes detected face images into one image, a feeling estimator that estimates a feeling of each conference participant based on the detected face image, and a display mode changer that changes a display mode of the face image of each conference participant based on the estimated feeling.

14 Claims, 11 Drawing Sheets

(51) Int. Cl.
  *G06F 13/14* (2006.01)
  *H04M 3/56* (2006.01)
  *G06T 1/20* (2006.01)
  *G06T 1/60* (2006.01)

(56) References Cited

U.S. PATENT DOCUMENTS

| | | | | |
|---|---|---|---|---|
| 7,768,543 | B2* | 8/2010 | Christiansen | H04L 29/06027 348/14.08 |
| 7,865,834 | B1* | 1/2011 | van Os | G09G 3/003 348/14.12 |
| 8,210,848 | B1* | 7/2012 | Beck | H04M 1/72594 382/307 |
| 8,350,891 | B2* | 1/2013 | Khot | H04N 7/15 348/14.08 |
| 8,373,799 | B2* | 2/2013 | Reponen | G10L 15/26 348/14.08 |
| 8,670,018 | B2* | 3/2014 | Cunnington | G06Q 10/10 348/14.08 |
| 9,088,688 | B2* | 7/2015 | Krans | H04N 7/142 |
| 9,710,142 | B1* | 7/2017 | Vendrow | H04L 65/403 |
| 10,250,851 | B1* | 4/2019 | Harpur | H04N 7/152 |
| 2008/0158334 | A1* | 7/2008 | Reponen | H04N 7/147 348/14.02 |
| 2014/0098174 | A1* | 4/2014 | Summers | H04N 7/15 348/14.1 |
| 2014/0376785 | A1 | 12/2014 | Bathiche | |
| 2015/0286858 | A1* | 10/2015 | Shaburov | G06K 9/00281 382/103 |
| 2016/0042226 | A1* | 2/2016 | Cunico | H04N 7/147 382/103 |
| 2018/0122368 | A1* | 5/2018 | Costello | H04M 3/56 |
| 2018/0262716 | A1 | 9/2018 | Kang | |
| 2019/0208165 | A1* | 7/2019 | Ahn | G06F 3/04817 |
| 2019/0320139 | A1* | 10/2019 | Toyoda | H04N 7/15 |
| 2020/0302817 | A1* | 9/2020 | Williams | G06Q 10/06311 |

OTHER PUBLICATIONS

Office Action issued in Chinese Appln. No. 201910874734.5 dated Dec. 2, 2020. English translation provided.

* cited by examiner

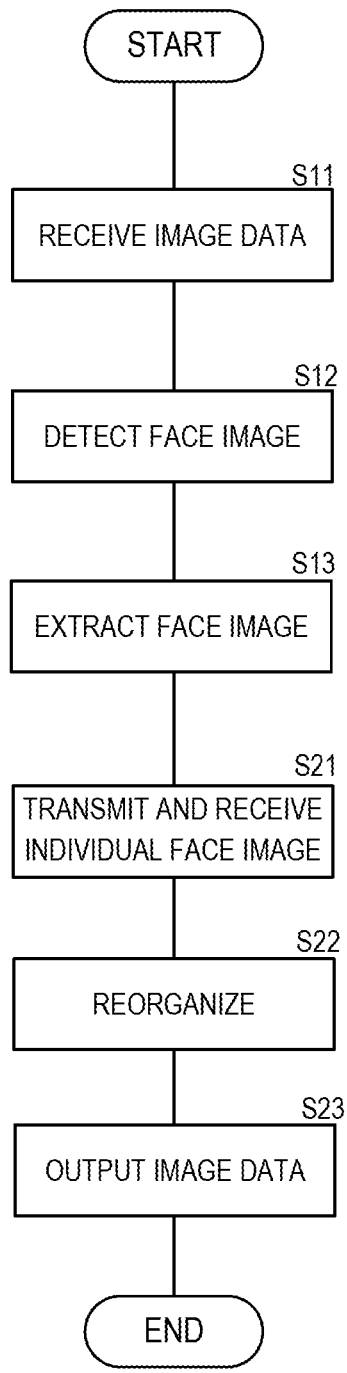

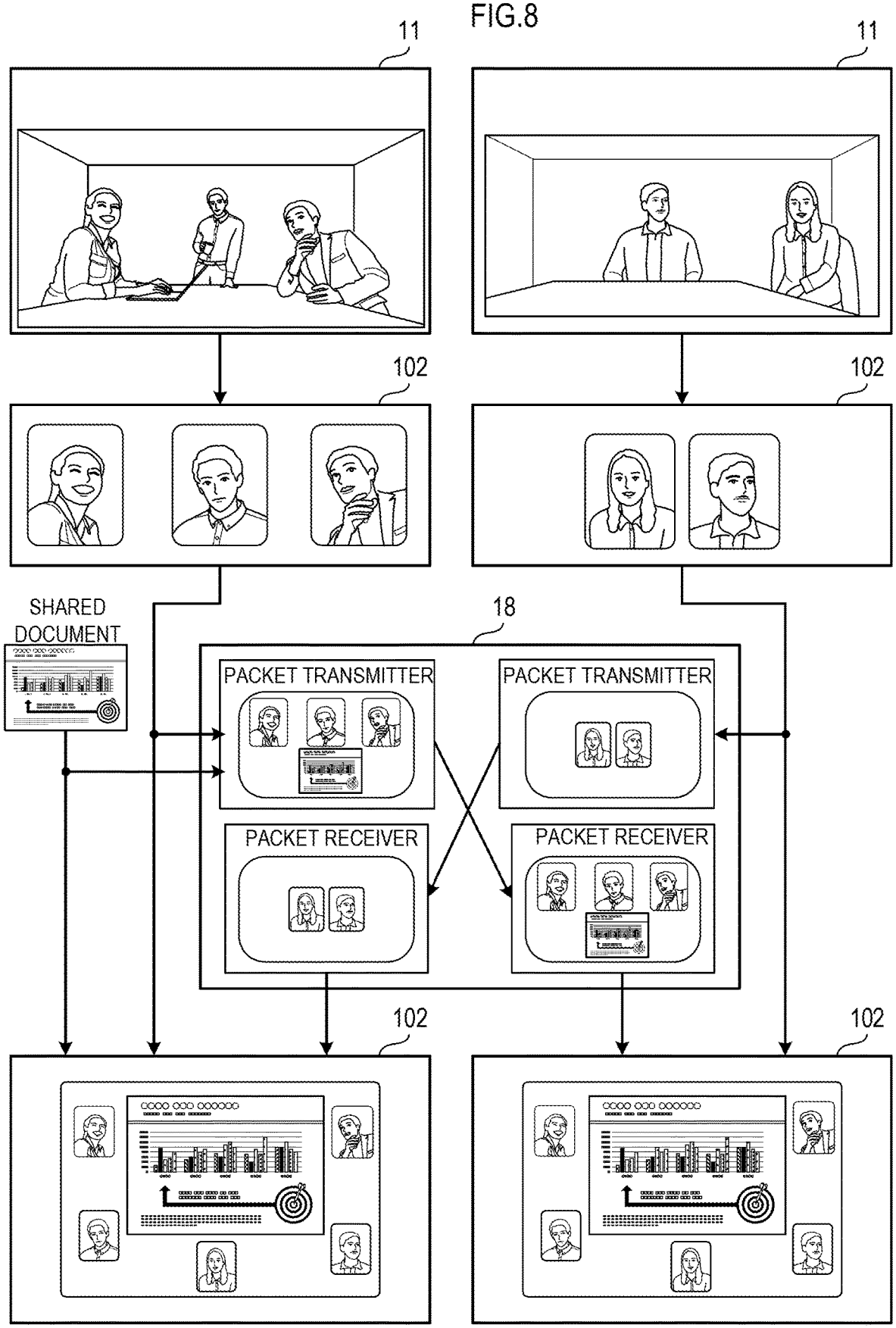

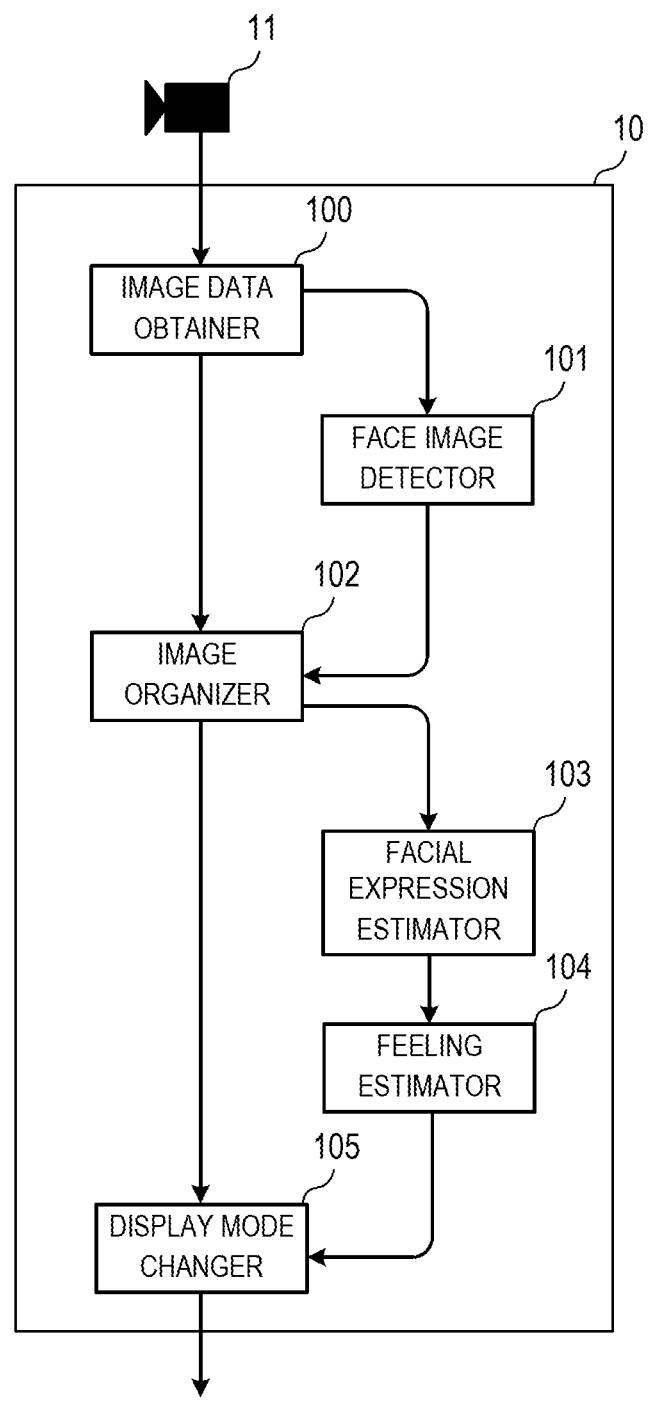

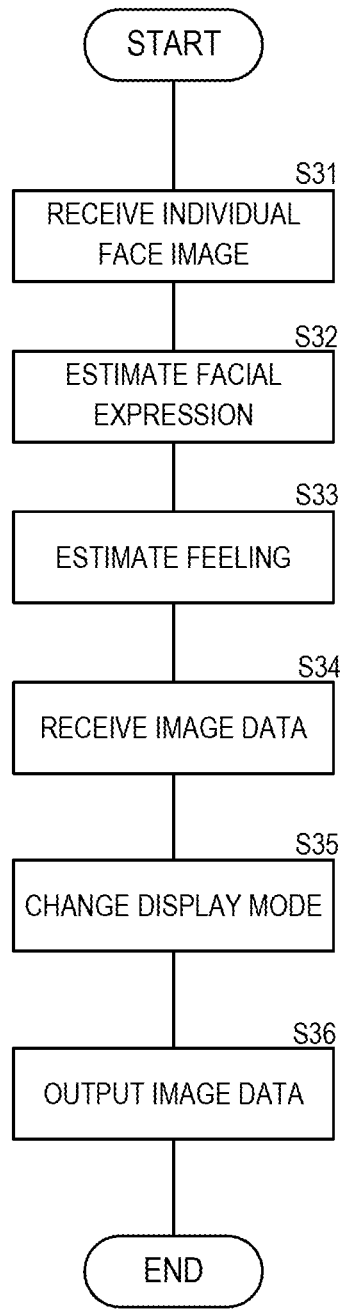

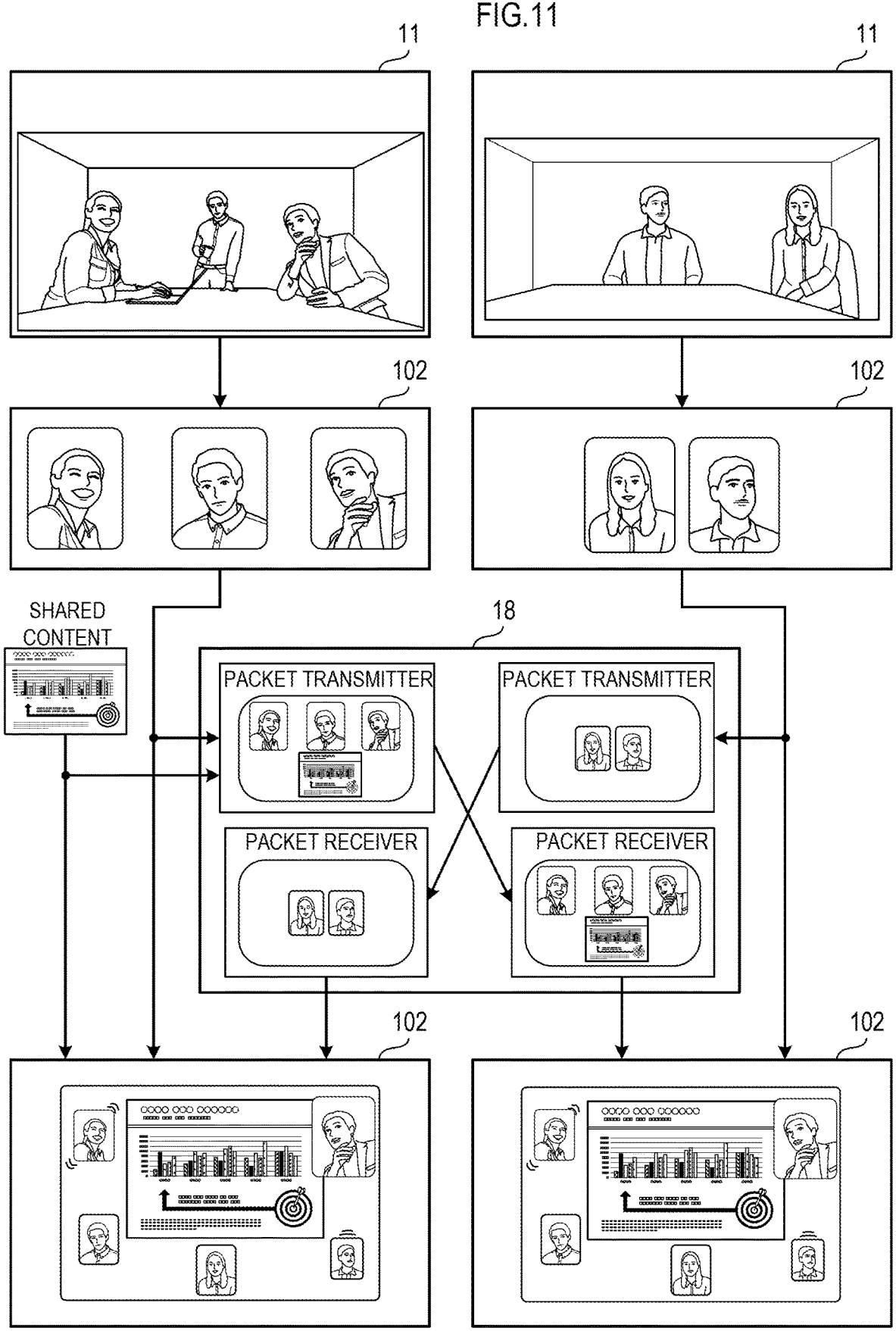

IMAGE PROCESSING APPARATUS, CAMERA APPARATUS, AND IMAGE PROCESSING METHOD

CROSS REFERENCE TO RELATED APPLICATIONS

This Nonprovisional application claims priority under 35 U.S.C. § 119(a) on Patent Application No. 2018-176898 filed in Japan on Sep. 21, 2018 the entire contents of which are hereby incorporated by reference.

BACKGROUND OF THE INVENTION

1. Field of the Invention

A preferred embodiment of the present invention relates to an image processing apparatus, a camera apparatus, and an image processing method that process an image captured by a camera.

2. Description of the Related Art

In a case in which a teleconference is performed by connecting remote places through a network, a plurality of conference participants may be captured by one camera. However, when the plurality of conference participants are captured by one camera, a face image of each conference participant is small. Therefore, the conference participants can hardly read facial expression of other conference participants.

Thus, for example, International Publication No. 2018/061173 discloses that an image of each conference participant is extracted from an image obtained by capturing a plurality of conference participants at the same time.

In addition, Japanese Unexamined Patent Application Publication No. 2011-61314 discloses a configuration in which a plurality of places, a plurality of conference participants, and materials are displayed on one screen.

In addition, Japanese Unexamined Patent Application Publication No. 2015-19162 discloses a configuration in which an image captured by a fisheye lens is converted to a planar image.

SUMMARY OF THE INVENTION

A preferred embodiment of the present invention is to provide an image processing apparatus that achieves a smooth conference.

An image processing apparatus includes an image data obtainer that obtains image data of an image that captures a plurality of conference participants, a face image detector that detects a face image of each of the plurality of conference participants from the image data obtained by the image data obtainer, and an image organizer that extracts a detected face image and reorganizes detected face images into one image.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a flow chart showing an operation of the image processing apparatus.

FIG. 8 is a diagram showing an example of displaying content related to a conference, together with a face image, in an image.

FIG. 9 is a block diagram showing the image processing function further including a facial expression estimator, a feeling estimator, and a display mode changer.

FIG. 10 is a flow chart showing an operation of the image processing apparatus.

FIG. 11 is a diagram showing an example of changing a display mode.

DETAILED DESCRIPTION OF THE PREFERRED EMBODIMENTS

Figure 1:
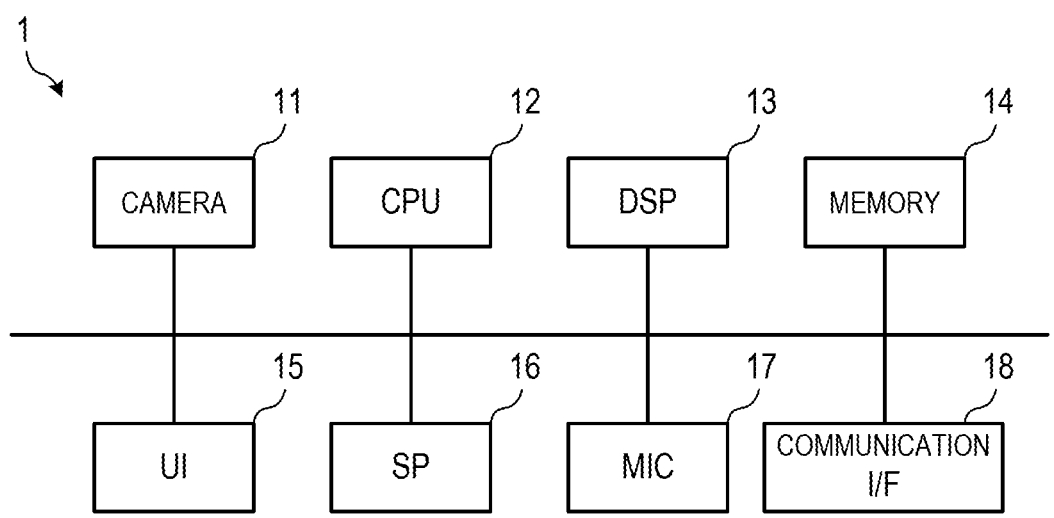
FIG. 1 is a block diagram showing a configuration of a camera apparatus including an image processing apparatus.

At a conference, a conference participant can perform smooth communication by reading facial expression and emotion of another conference participant. However, it is difficult to read a feeling of each conference participant from an image that displays a plurality of conference participants.

In view of the foregoing, a preferred embodiment of the present invention is to provide an image processing apparatus, a camera apparatus, and an image processing method that are configured to enable a conference participant to intuitively read a feeling of each conference participant from an image that displays a plurality of conference participants.

An image processing apparatus includes an image data obtainer that obtains image data of an image that captures a plurality of conference participants, a face image detector that detects a face image of each of the plurality of conference participants from the image data obtained by the image data obtainer, an image organizer that extracts a detected face image and reorganizes detected face images into one image, a feeling estimator that estimates a feeling of each conference participant based on the detected face image, and a display mode changer that changes a display mode of the face image of each conference participant based on the estimated feeling.

According to a preferred embodiment of the present invention, a conference participant is able to intuitively read a feeling of each conference participant from an image that displays a plurality of conference participants.

An image processing apparatus according to the present preferred embodiment of the present invention includes an image data obtainer that obtains image data of an image that captures a plurality of conference participants, a face image detector that detects a face image of each of the plurality of conference participants from the image data obtained by the image data obtainer, an image organizer that extracts a detected face image and reorganizes detected face images into one image, a feeling estimator that estimates a feeling of each conference participant based on the detected face image, and a display mode changer that changes a display mode of the face image of each conference participant based on the estimated feeling.

The image processing apparatus according to the present preferred embodiment of the present invention enables a conference participant to easily read facial expression of each conference participant by extracting a face image of each conference participant from an image obtained by capturing a plurality of conference participants at the same time. Furthermore, since the image processing apparatus changes the face image of each conference participant, depending on the feeling of each conference participant, a conference participant can easily read the feeling of each conference participant more intuitively. For example, the image processing apparatus displays a face image of a conference participant who has a pleasant feeling, in a shaking manner. Another participant who sees the face image changing to shake can intuitively recognize that the conference participant corresponding to the face image has a pleasant feeling. It is to be noted that the display mode changer may change a display position of the face image in the one image, based on the estimated feeling. Alternatively, the display mode changer may add animation to the face image, based on the estimated feeling. In addition, the display mode changer may change a color of the face image in the one image, based on the estimated feeling. It is to be noted that a change in color includes a change in hue, a change in brightness, a change in saturation, and a change in tone.

In addition, the image processing apparatus may include a facial expression estimator that estimates facial expression of each conference participant, based on the detected face image. In such a case, the feeling estimator estimates the feeling based on the facial expression estimated by the facial expression estimator. Facial expression is an index for expressing a feeling. Facial expressions and feelings are closely related to each other. Therefore, the image processing apparatus, by first estimating facial expression from a face image and then estimating a feeling based on the estimated facial expression, is able to estimate a feeling more accurately.

In addition, the one image may display content (a shared document, for example) related to a conference, together with the face image.

The conference participants include a speaker and a listener. The speaker converses using content such as presentation material. Such content is displayed, for example, on a screen for a projector, or a monitor. The speaker and the listener have a conference while looking at the screen or the monitor. The listener, since looking at the screen, has difficulty simultaneously looking at the facial expression of the speaker who is present in the same room, and the content. The speaker also has difficulty simultaneously looking at the facial expression of the listener who is present in the same room, and the content.

However, as described above, the image processing apparatus reorganizes the face image of each conference participant and the content, into one image. Therefore, the conference participants, since being able to converse while looking at mutual facial expression, can have a smooth conference.

In addition, the one image may be shared by all of a plurality of image processing apparatuses that configure a teleconference. In other words, the same image may be displayed at all locations. Typically, in a teleconference, an image on a far end side is displayed large and an image on a near end side is displayed small. In such a case, the conference participants are strongly conscious of conversing between one location and another location. However, the image processing apparatus according to the present preferred embodiment of the present invention shares in all locations one image reorganized by extracting a face image of each conference participant, and displays the same image in all the locations. Therefore, the conference participants can easily recognize that all the conference participants are present in the same place and having a conference, without being conscious of a far end side or a near end side.

Figure 2:
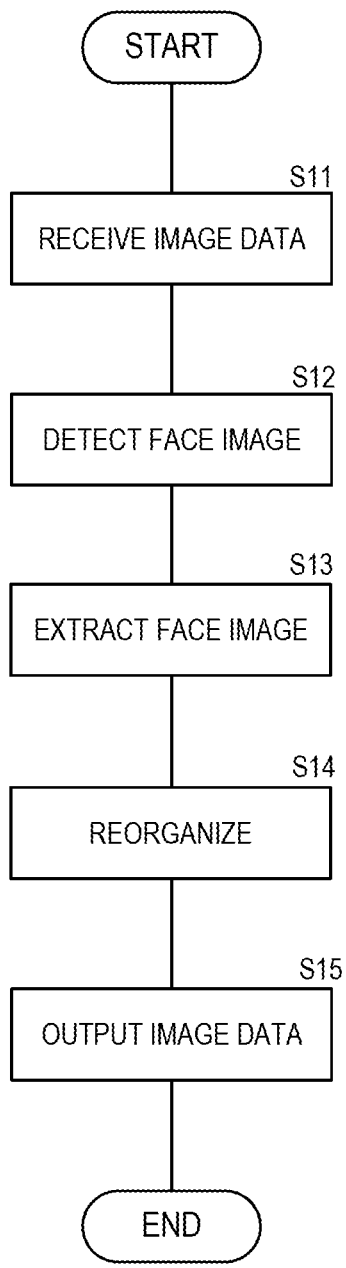
FIG. 2 is a flow chart showing an operation of the image processing apparatus.

Hereinafter, a specific configuration according to a preferred embodiment of the present invention will be described. FIG. 1 is a block diagram showing a configuration of a camera apparatus 1 including an image processing apparatus 10. FIG. 2 is a flow chart showing an operation of the image processing apparatus 10.

The camera apparatus 1 includes a camera 11, a CPU 12, a DSP 13, a memory 14, a user interface (UI) 15, a speaker (SP) 16, a microphone (MIC) 17, and a communication interface (I/F) 18. The camera apparatus 1 is implemented by an information processor such as a personal computer, for example.

Figure 3:
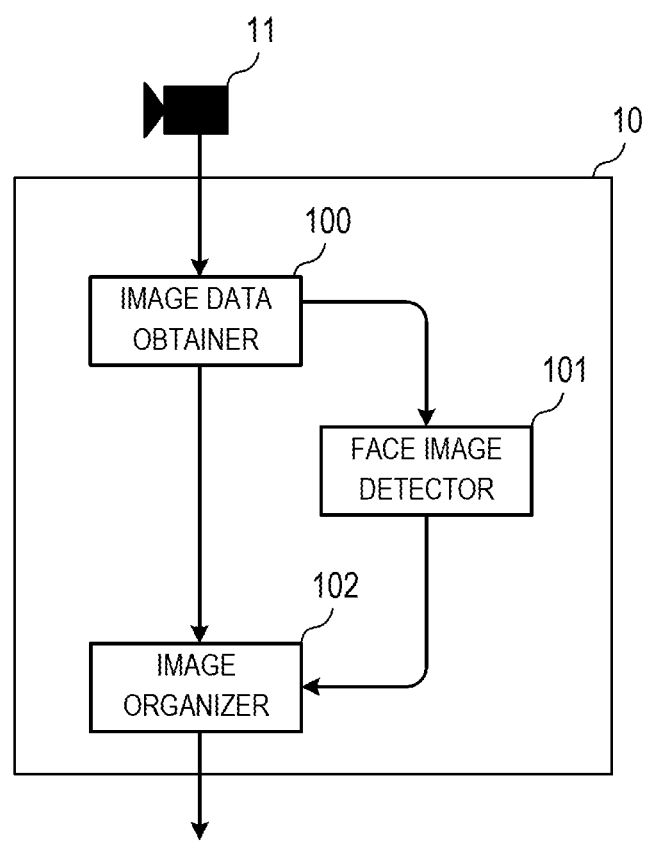
FIG. 3 is a block diagram showing an image processing function (the image processing apparatus).

FIG. 3 is a functional block diagram corresponding to the image processing apparatus 10. Such a functional configuration (a task) is implemented when hardware such as the CPU 12 and the DSP 13 reads and executes a program from the memory 14. In other words, the image processing apparatus 10 is obtained when the hardware such as the CPU 12 and the DSP 13 reads and executes a program (instructions) from the memory 14. It is to be noted that the program does not need to be stored in the memory 14. For example, the program may be stored in a server. In such a case, the image processing apparatus 10 downloads the program from the server through a network and executes the program.

The image processing apparatus 10 includes an image data obtainer 100, a face image detector 101, and an image organizer 102. The image data obtainer 100 receives image data from the camera 11 (S11).

The camera 11, similarly to a screen of a projector, is installed on an indoor wall or the like. The camera 11 is configured so as to capture a plurality of conference participants. Therefore, the camera 11 generates image data of an image that captures the plurality of conference participants. The camera 11 is an example of the image data obtainer. It is to be noted that the image processing apparatus 10 and the camera 11 do not need to be an integrally configured device as the camera apparatus 1 and may be respectively different devices. In such a case, the image processing apparatus 10 receives image data from the camera through the communication I/F such as a USB. In such a case, the communication I/F such as a USB configures the image data obtainer.

The face image detector 101 detects a face image of each conference participant from received image data (S12). The method of detecting a face image may be any method. For example, the face image detector 101 extracts an amount of characteristic of a face image from the received image data, and detects the face image by performing template matching with database of face images. The face image detector 101 may detect the face image by a neural network. In addition, the face image detector 101 may combine learning processes such as deep learning.

The information indicating a detection result of a face image is outputted to the image organizer 102. The image organizer 102 extracts the face image from the received image data, based on the detection result of a face image (S13).

Figure 4:
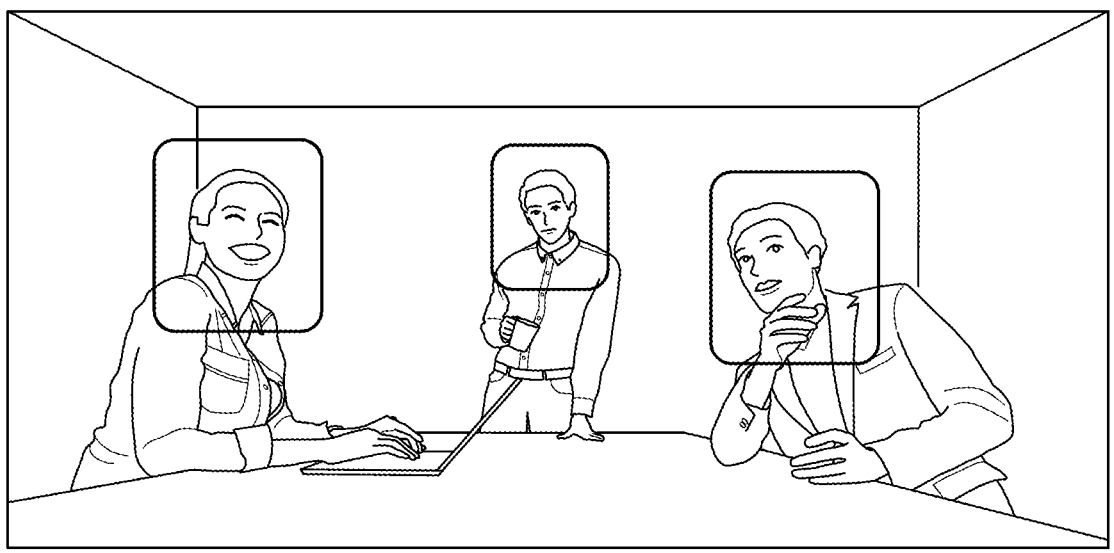
FIG. 4 is a diagram showing an example of an image that a camera 11 has captured.

FIG. 4 is a diagram showing an example of an image that the camera 11 has captured. The example of the image of FIG. 4 includes three conference participants. Therefore, the face image detector 101 detects a face image of each of the three conference participants. The image organizer 102 extracts the face image of the three conference participants who have been detected. The image organizer 102 enlarges each of the extracted face images (hereinafter referred to as an individual face image) and reorganizes the face images into one image (S14).

The image organizer 102 outputs the reorganized image data through the communication I/F 18 (S15). For example, the reorganized image data is outputted, for example, to a display such as a projector or a monitor.

Figure 5:
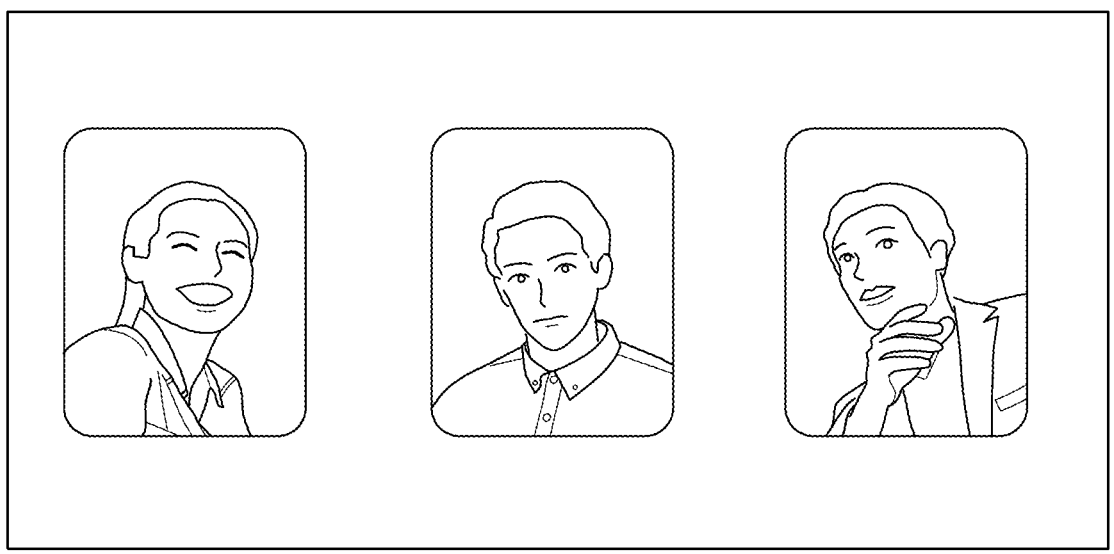
FIG. 5 is a diagram showing an example of a reorganized image.

Accordingly, as shown in FIG. 5, the face images of all the conference participants are displayed as one image on the screen of a projector, or a monitor. Therefore, a conference participant can easily read each facial expression and can also easily read feeling.

It is to be noted that, in a case in which the conference is a teleconference, the image organizer 102 transmits an individual face image to a different device as packet data through the communication I/F 18. In such a case, the communication I/F 18 configures a packet transmitter. In addition, the image organizer 102 receives as packet data an individual face image outputted from the different device through the communication I/F 18. In such a case, the communication I/F 18 configures a packet receiver. The image organizer 102 enlarges and combines each of the individual face image extracted by the own device and the individual face image received from the different device, and reorganizes the face images into one image.

Figure 6:
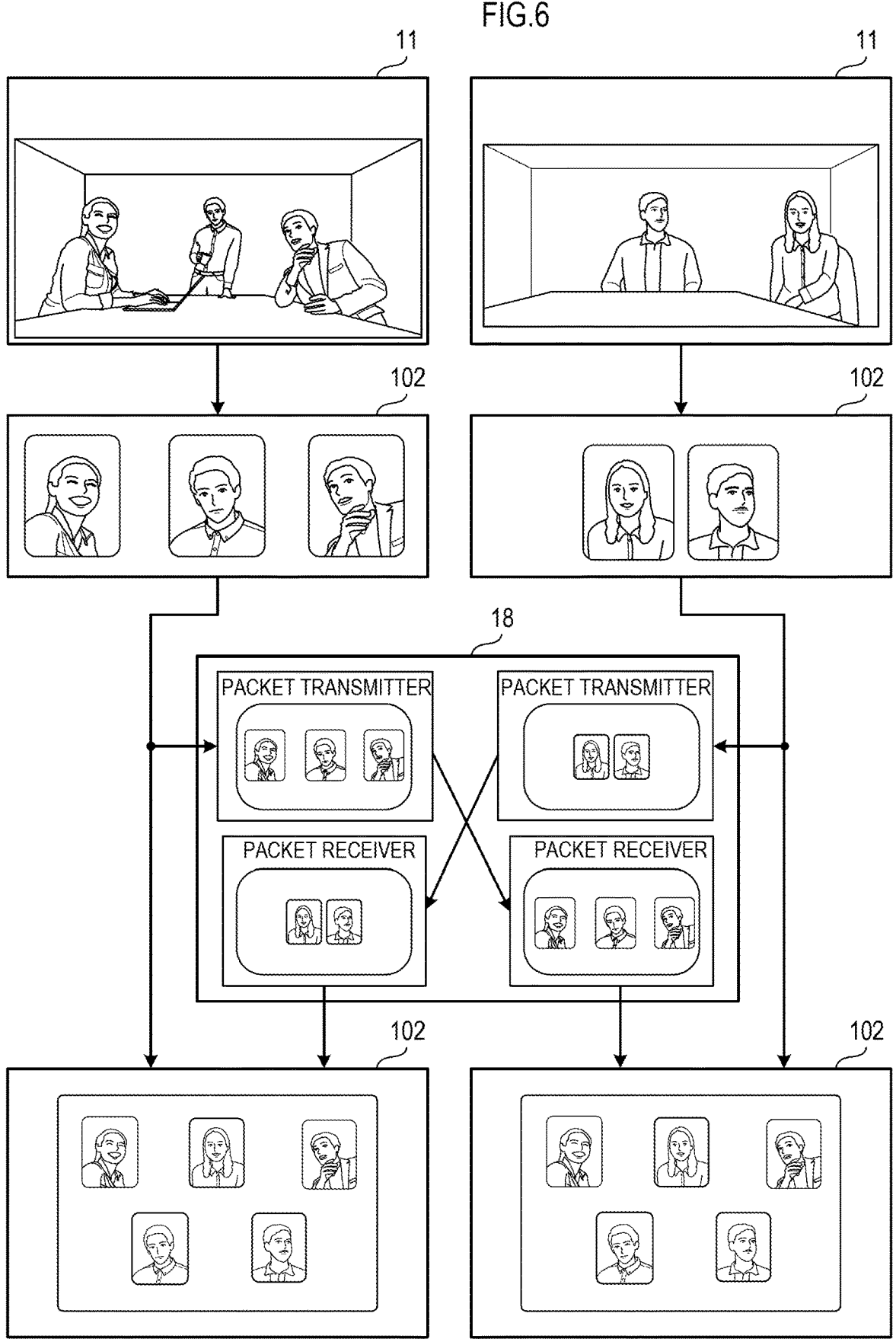
FIG. 6 is a diagram showing a flow of processing of each of a plurality of image processing apparatuses that configure a teleconference.

FIG. 6 is a diagram showing a flow of processing of each of a plurality of image processing apparatuses 10 that configure a teleconference. FIG. 7 is a flow chart showing an operation of the image processing apparatus 10. In FIG. 7, the same reference numerals are used to refer to processing common to the flow chart in FIG. 2, and the description is omitted.

In the plurality of image processing apparatuses 10, each image organizer 102 extracts a face image from an image captured by each camera 11 (S13). The each image organizer 102 transmits and receives an individual face image through the communication I/F 18 (S21). The image organizer 102 enlarges and combines each of the individual face image extracted by the own device and the individual face image received from the different device, and reorganizes the face images into one image (S22). The reorganized image data is outputted, for example, to a display such as a projector or a monitor (S23).

In this manner, the face images of all conference participants at the teleconference are displayed as one image on a screen or a monitor in each of respective locations that configure the teleconference. Therefore, a conference participant can easily read each facial expression and can also easily read feeling. It is to be noted that it is not always necessary to enlarge an individual face image. When all the conference participants are displayed in one image, a conference participant can see the faces of all the conference participants only by looking at one screen. Therefore, the conference participant can more easily read each facial expression and feeling than before.

It is to be noted that, in the processing of S14 in FIG. 2 or S22 in FIG. 6, the image organizer 102 may display content (a shared document, for example) related to the conference, together with the individual face image, in the image. For example, as shown in FIG. 8, some devices among the image processing apparatuses that configure the teleconference transmit a shared document. The image organizer 102, in the processing of S14 or S22, reorganizes the image including shared documents that have been transmitted and received.

As a result, the conference participants, since being able to converse while mutually looking at facial expressions and looking at the shared documents at the same time, can have a smooth conference.

It is to be noted that a reorganized image may be shared in all the image processing apparatuses 10 that configure the teleconference or the reorganized image of the conference participant on a near end side may be enlarged. However, when the same image is displayed in all the locations, the conference participants can easily recognize that all the conference participants are present in the same place and having a conference, without being conscious of a far end side or a near end side.

In addition, respective images of the conference participants may also be displayed in the same size, or the image of the conference participant on the near end side may be displayed large and the image of the conference participant on the far end side may be displayed small. In addition, a speaker may be detected and the individual face image of the speaker may be displayed large.

In addition, image processing does not need to be performed in a device in each location, and may be performed by a server. The device in each location transmits image data of an image captured by the camera 11, to the server. The server extracts an individual face image and reorganizes individual face images into one image. The server distributes reorganized image data to each location. In addition, the device in each location may extract an individual face image, for example. The server receives the individual face image from the device in each location and reorganizes individual face images into one image.

FIG. 9 is a functional block diagram of the image processing apparatus 10 further including a facial expression estimator 103, a feeling estimator 104, and a display mode changer 105. FIG. 10 is a flow chart showing an operation of the image processing apparatus 10. In FIG. 10, the same reference numerals are used to refer to processing common to the flow chart in FIG. 2, and the description is omitted.

Each configuration shown in FIG. 9 is also implemented when hardware such as the CPU 12 and the DSP 13 reads and executes a program from the memory 14.

The facial expression estimator 103 receives an individual face image from the image organizer 102 (S31). The facial expression estimator 103 estimates facial expression of each conference participant, based on the individual face image (S32). The method of estimating facial expression may be any method. For example, the facial expression estimator 103 extracts an amount of characteristic of a face image from received image data, and estimates facial expression by performing template matching with database of face images corresponding to various facial expressions. The facial expressions include, for example, laughter, surprise, cry, anger, darkness, brightness, or tension. In addition, the facial expressions also include blankness. The facial expression estimator 103 may estimates the facial expression by a neural network. In addition, the facial expression estimator 103 may combine learning processes such as deep learning.

The information indicating an estimated facial expression is outputted to the feeling estimator 104. The feeling estimator 104 estimates feeling of each conference participant, based on the facial expression estimated by the facial expression estimator 103 (S33). The method of estimating feeling may also be any method. For example, the feeling estimator 104 selects feeling matched with a received facial expression with reference to feeling database in which facial expression and feeling are associated with each other. The feeling, for example, includes various types of feelings such as fun, seriousness, boredom, impression, excitement, sadness, anger, abandonment, surprise, disgust, fear, embarrassment, or satisfaction. For example, in a case of the fear or the surprise, the facial expression corresponds to the feeling. In addition, the facial expression of laughter or bright facial expression highly correlates to the feeling of joy. In addition, the feeling estimator 104 may estimate feeling based on information related to a sight line. The feeling estimator 104 receives an individual face image from the image organizer 102, and extracts sight line information. It can be estimated that, when the sight line is directed to the front, seriousness may be high, and, when the sight line is directed in other directions, the feeling of idleness may be shown.

It is to be noted that it is not always necessary to estimate the feeling, based on a facial expression estimation result by the facial expression estimator 103. For example, the feeling estimator 104 extracts an amount of characteristic of a face image from received image data, and may directly estimate feeling by performing template matching with database of face images corresponding to various facial expressions. However, facial expression is an index for estimating a feeling. Therefore, the feeling estimator 104 is able to estimate feeling with higher accuracy by estimating the feeling based on the facial expression estimation result by the facial expression estimator 103.

In addition, the feeling estimator 104 may estimate the feeling by a neural network or may combine learning processes such as deep learning.

An estimation result of the feeling estimator 104 is outputted to the display mode changer 105. The display mode changer 105 receives image data from the image organizer 102 (S34). The display mode changer 105 changes a display mode of the face image of each conference participant, based on the feeling estimated by the feeling estimator 104 (S35). The image organizer 102 outputs the image data after the display mode is changed (S36). A change in the display mode includes a change in color, a change in position, a change in size, or animation addition.

For example, in the example of FIG. 11, the display mode changer 105 adds shaking animation to an image of a conference participant with a pleasant feeling. It is to be noted that the strength of animation may be changed, depending on the degree of feeling.

In addition, the display mode changer 105 may enlarge the image of a conference participant with a serious feeling, such as a speaker, and may reduce the image of a conference participant with a boring feeling. In addition, the display mode changer 105 may move upward the image of the conference participant with a serious feeling, such as a speaker, and may move downward the image of the conference participant with a bored feeling.

In addition, the display mode changer 105 may bring the images of conference participants with the similar feeling closer to each other. For example, the display mode changer 105 makes the images of the conference participants with a serious feeling adjacent to each other and also makes the images of the conference participants with a boring feeling adjacent to each other.

Alternatively, the display mode changer 105 may brightly display the images of a conference participant with a pleasant feeling and a conference participant with a serious feeling, and may darkly display the image of a conference participant with a bored feeling. In other words, the display mode changer 105 may change a color according to the feeling.

It is to be noted that, in the example shown from FIG. 9 to FIG. 11, reorganization of the individual face images by the image organizer 102 is not essential. The image organizer 102 may output an image that captures a plurality of conference participants as it is, and the display mode changer 105 may only change a display mode of an image of each conference participant in the image that captures the plurality of conference participants. In this manner, even when reorganization of the individual face images is not performed, the conference participant can intuitively read the feeling of each conference participant from the image that displays a plurality of conference participants.

Finally, the present preferred embodiment is illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. A communication system comprising:
a plurality of image processing apparatuses for conferencing, each of the plurality of image processing apparatuses comprising:
at least one memory device that stores instructions; and
at least one processor that implements the instructions to:
obtain image data of an image that captures a plurality of conference participants;
detect a face image of each of the plurality of conference participants, including a conference participant on a near end side, from the obtained image data;
extract the detected face image of each of the plurality of conference participants and reorganize all the detected face images into one image displaying all the detected face images arranged surrounding a shared document relating to the conference;
estimate a feeling of each of the plurality of conference participants based on the respective detected face image;
change a display mode, including a display position or size, of the detected face image of each of the plurality of conference participants based on the respective estimated feeling; and
output the one image for displaying for the respective image processing apparatus so that the same one image is displayed in all of the plurality of image processing apparatuses.

2. A communication system comprising:
a plurality of image processing apparatuses for conferencing, each of the plurality of image processing apparatuses comprising:
an image data obtainer that obtains image data of an image that captures a plurality of conference participants;
a face image detector that detects a face image of each of the plurality of conference participants, including a conference participant on a near end side, from the image data obtained by the image data obtainer;
an image organizer that extracts the detected face image of each of the plurality of conference participants and reorganizes all the detected face images into one image displaying all the detected face images arranged surrounding a shared document relating to the conference;

a feeling estimator that estimates a feeling of each of the plurality of conference participants based on the respective detected face image; and a display mode changer that changes a display mode, including a display position or size, of the detected face image of each of the plurality of conference participants based on the respective estimated feeling, wherein the image organizer outputs the one image for displaying for the respective image processing apparatus so that the same one image is displayed in all of the plurality of image processing apparatuses.

3. The communication system according to claim 2, further comprising:

a facial expression estimator that estimates a facial expression of each of the plurality of conference participants based on the respective detected face image, wherein the feeling estimator estimates the feeling of each of the plurality of conference participants based on the respective facial expression estimated by the facial expression estimator.

4. The communication system according to claim 2, wherein the image data obtainer of each of the plurality of image processing apparatuses obtains the image data from other image processing apparatuses among the plurality of image processing apparatuses.

5. The communication system according to claim 2, wherein the display mode changer adds animation to the detected face image of at least one of the plurality of conference participants, based on the respective estimated feeling.

6. The communication system according to claim 2, wherein the display mode further includes a color.

7. The communication system according to claim 2, wherein the image organizer reorganizes all the detected face images, in a same size, into the one image.

8. A camera apparatus comprising:
the communication system according to claim 2; and
a camera that obtains the image data for each of the plurality of image processing apparatuses.

9. An image processing method for a communication system including a plurality of image processing apparatuses for conferencing, the method being executed by each of the plurality of image processing apparatuses and comprising:

obtaining image data of an image that captures a plurality of conference participants;

detecting a face image of each of the plurality of conference participants, including a conference participant on a near end side, from the obtained image data;

extracting the detected face image of each of the plurality of conference participants and reorganizing all the detected face images into one image displaying all the detected face images arranged surrounding a shared document relating to the conference;

estimating a feeling of each of the plurality of conference participants based on the respective detected face image;

changing a display mode, including a display position or size, of the detected face image of each of the plurality of conference participants based on the respective estimated feeling; and outputting the one image for displaying for the respective image processing apparatus so that the same one image is displayed in all of the plurality of image processing apparatuses.

10. The image processing method according to claim 9, further comprising:

estimating a facial expression of each of the plurality of conference participants based on the respective detected face image, wherein the estimating estimates the feeling of each of the plurality of conference participants based on the respective estimated facial expression.

11. The image processing method according to claim 9, further comprising obtaining the image data from other processing apparatuses among the plurality of image processing apparatuses.

12. The image processing method according to claim 9, further comprising adding animation to the detected face image of at least one of the plurality of conference participants, based on the respective estimated feeling.

13. The image processing method according to claim 9, wherein the display mode further includes a color.

14. The image processing method according to claim 9, wherein the reorganizing of the one image includes reorganizing all the detected face images, in a same size, into the one image.

* * * * *